(12) United States Patent
Dishnica et al.

(10) Patent No.: US 12,164,018 B2
(45) Date of Patent: Dec. 10, 2024

(54) METHOD AND SYSTEM FOR DETECTING AN OBJECT

(71) Applicant: Carrier Fire & Security EMEA BV, Diegem (BE)

(72) Inventors: Devis Dishnica, Oakville, CT (US); Mateusz Mazur, Gdańsk (PL)

(73) Assignee: CARRIER FIRE & SECURITY EMEA BV, Diegem (BE)

( * ) Notice: Subject to any disclaimer, the term of this patent is extended or adjusted under 35 U.S.C. 154(b) by 412 days.

(21) Appl. No.: 17/713,711

(22) Filed: Apr. 5, 2022

(65) Prior Publication Data

US 2022/0317274 A1 Oct. 6, 2022

(30) Foreign Application Priority Data

Apr. 6, 2021 (EP) .................................. 21166924

(51) Int. Cl.
*G01S 13/10* (2006.01)
*G01S 5/02* (2010.01)
*H04W 64/00* (2009.01)

(52) U.S. Cl.
CPC ............ *G01S 13/10* (2013.01); *G01S 5/0284* (2013.01); *H04W 64/006* (2013.01)

(58) Field of Classification Search
CPC ...... G01S 13/10; G01S 13/106; G01S 5/0284; H04W 64/006; H04W 64/00
See application file for complete search history.

(56) References Cited

U.S. PATENT DOCUMENTS 5,361,070 A 11/1994 McEwan
6,177,903 B1 1/2001 Fullerton et al.
(Continued)

FOREIGN PATENT DOCUMENTS

JP 2015041332 A 3/2015
JP 6174419 B2 8/2017
(Continued)

OTHER PUBLICATIONS

Brena et al, "Evolution of Indoor Positioning Technologies: A Survey", Journal of Sensors, vol. 2017, Jan. 1, 2017 (Jan. 1, 2017), pp. 1-21.
European Search Report for Application No. 21166924.7; Issued Sep. 16, 2021, 13 Pages.
Fang et al, "Non-Line-of-Sight Around the Corner Human Presence Detection Using Commodity WiFi Devices", Department of Computer Science, Nov. 10, 2019 (Nov. 10, 2019), pp. 22-26.
Huang et al., "Feasibility and Limits of Wi-Fi Imaging", Embedded Network Sensor Systems, Nov. 3, 2014 (Nov. 3, 2014), pp. 266-279.
(Continued)

*Primary Examiner* — Keith Ferguson
(74) *Attorney, Agent, or Firm* — CANTOR COLBURN LLP

(57) ABSTRACT

A method of determining a position of an object, the method including: receiving a first signal reflected from the object using a first device, the first device a peer to peer wireless communication device, interrogating a native communication protocol on the first device to output a first angle of arrival corresponding to the angle of arrival of the first signal at the first device, using a second device remote from the first device to receive a second signal reflected from the object, the second device a peer to peer wireless communication device, interrogating a native communication protocol on the second device to output a second angle of arrival corresponding to the angle of arrival of the second signal at the second device, calculating the position of the object based on the first and second angles of arrival, wherein the first and second devices are isolated from each other.

15 Claims, 5 Drawing Sheets

(56) References Cited

U.S. PATENT DOCUMENTS

| | | |
|---|---|---|
| 6,218,979 B1 | 4/2001 | Barnes et al. |
| 6,239,741 B1 | 5/2001 | Fontana et al. |
| 6,614,384 B2 | 9/2003 | Hall et al. |
| 7,046,187 B2 | 5/2006 | Fullerton et al. |
| 7,132,975 B2 | 11/2006 | Fullerton et al. |
| 7,256,727 B2 | 8/2007 | Fullerton et al. |
| 8,068,051 B1 | 11/2011 | Osterweil |
| 8,461,989 B2 | 6/2013 | Romero et al. |
| 8,847,754 B2 | 9/2014 | Buchheim et al. |
| 8,988,275 B2 | 3/2015 | Kisliansky et al. |
| 2008/0165046 A1 | 7/2008 | Fullerton et al. |
| 2019/0346550 A1 | 11/2019 | Finn et al. |
| 2020/0166624 A1 | 5/2020 | Gunther |
| 2020/0174110 A1 | 6/2020 | Carlson et al. |
| 2020/0371220 A1* | 11/2020 | Eitan ................ G01S 13/46 |

FOREIGN PATENT DOCUMENTS

| | | |
|---|---|---|
| WO | 2014184024 A1 | 11/2014 |
| WO | 2019164370 A1 | 8/2019 |
| WO | 2020064120 A1 | 4/2020 |

OTHER PUBLICATIONS

Wei et al., "mTrack High-Precision Passive Tracking Using Millimeter Wave Radios", User Interface Software and Technology, Department of Electrical and Computer Engineering, Sep. 7, 2015 (Sep. 7, 2015), pp. 117-129.

European Search Reports for Application No. 21166924.7, Issued Jun. 27, 2024, 11 Pages.

Li et al., "Dynamic-Music: Accurate Device-Free Indoor Localization", User Interface Software and Technology, Sep. 12, 2016, pp. 196-207.

* cited by examiner

METHOD AND SYSTEM FOR DETECTING AN OBJECT

FOREIGN PRIORITY

This application claims priority to European Patent Application No. 21166924.7, filed Apr. 6, 2021, and all the benefits accruing therefrom under 35 U.S.C. § 119, the contents of which in its entirety are herein incorporated by reference.

TECHNICAL FIELD OF INVENTION

The present invention relates to a method of determining a position of an object and a system configured to perform the method.

BACKGROUND OF THE INVENTION

At present, it is possible to determine the position of an object via different technologies including radars. However, these types of technology are typically relatively expensive, which causes a barrier that limits entrance to the market. There is therefore a need to provide low cost alternatives for determining the position of an object.

There is presently a rapid development of Internet of Things technologies adopting communication protocols, such as Bluetooth LE 5.1 and UWB, as a solution to providing low cost position determination methods. In these available methods it is required that the target object to be located has a beacon or active transmitter device configured to communicate with another active device both using a relevant communication protocol. As such these methods are limited to situations where a transponder is associated to the target object.

Hence there is a further need to provide a low cost solution to position determination, which allows objects not associated with active communication devices to be detected and their position determined.

SUMMARY OF THE INVENTION

Viewed from a first aspect, the invention provides a method of determining a position of an object, the method comprising: receiving a first signal reflected from the object using a first device, wherein the first device is a peer to peer wireless communication device, interrogating a native communication protocol on the first device to output a first angle of arrival corresponding to the angle of arrival of the first signal at the first device, using a second device remote from the first device to detect a second signal reflected from the object, wherein the second device is a peer to peer wireless communication device, interrogating a native communication protocol on the second device to output a second angle of arrival corresponding to the angle of arrival of the second signal at the second device, calculating the position of the object based on the first and second angles of arrival, wherein the first and second devices are isolated from each other such that there is no line of sight communication in the radio frequency domain between the devices.

The first and second peer to peer wireless communication devices are isolated from each other such that no direct communication can occur between the two devices. However, the first and second devices may still communicate via signals passed between the devices if those signals are reflected e.g. from an object. The first and second devices may only communicate via reflected signals. Communication between the first and second device via direct (i.e. line of sight) signals may be impossible.

The first and second peer to peer wireless communication devices may be substantially the same as each other, and discussion herein in respect of one device may apply equally to the other, and vice versa. The first and second devices may be configured to operate using the same communication standard. They may be configured to communicate directly with one another, and may be intended for use with such direct communication. That is, they may be adapted to be used with direct communication between them, and their line-of-sight isolation from one another per the method described herein may therefore be contrary to their intended use. As such, the first and second device may be commercially available devices and may not need to be specially adapted for use with the method described herein. The first and second peer to peer wireless communication devices may comprise protocols and/or any suitable software that would enable them to communicate directly with each other (if not for their isolation from another).

Information obtained from the signal detected at the first, e.g. the information contained in the signal and the measured parameters regarding the arrival of the reflected signal, allow for the position of the object causing the reflection to be determined. Parameters regarding the arrival of the signal at the first device can be input into a native communication protocol present on the first device, and the native communication protocol may then output an angle of arrival of the reflected signal based on these parameters.

In particular, the first peer to peer device may comprise multiple antennas and each antenna may detect the reflected signal. The native communication protocol is operable to produce an angle of arrival e.g. by assessing the time interval between the detection of the reflected signal at the first antenna and the detection of the reflected signal at the second antenna, which may be denoted as the 'time difference of arrival'. This time difference can be used to determine the angle of arrival of the reflected signal at the first device. For example, using the speed of light, this time difference can be converted into a difference in distance travelled by the reflected signal in order to the reach the respective antenna from the position of the object, i.e. the point at which the reflected signal originates, and using this the angle between the device and the object can be determined. This may also require use of the distance between the two antennas. The angle of arrival may also be determined using the phase difference between the signals detected by at each of the antennas. The phase difference can also be converted into a difference in the distance travelled by the detected signals using the speed of light and knowledge of either the wavelength or the frequency of the light, thus allowing an angle of arrival to be determined.

Hence the relative angle between the first device and the origin of the reflected signal, i.e. the object causing the reflection, can be calculated by the native communication protocol present on the first device. Thus, the first device is configured to determine and output the angle of arrival of the first reflected signal. Since the first peer to peer wireless communication device is natively configured to output the angle of arrival of a signal it receives, and since the signal it receives is reflected from the object to be detected, the direction of the objection relative to the first device can be readily obtained from the first device alone.

Repeating this measurement and retrieving the angle of arrival for the second reflected signal received at the second device, i.e. the second angle of arrival, provides the relative angle between the second device and the object. Knowing the distance between the first and second devices, or equivalently knowing the positions or relative positions of the devices, and combining this with the two angles of arrival allows the position of the object to be determined. Assuming that the first and second reflected signals will have originated from the same location, the intersection of the lines extending from the first and second devices at the respective angle of arrival will identify the location of the reflective object.

Typically ranging (e.g. detection) between peer to peer devices requires the exchange of information using direct, or line of sight, communication; determining a position of an object in this way requires that the object for which the position is determined is itself one of the peer to peer devices. By isolating the first and second devices so that direct line of sight signals cannot be received, only reflected signals are received. This means that the object being located need not transmit a signal. This increases the scope of what object can be detected, for example a person, drone, animal, inanimate object, or piece of furniture bearing no means of communication can be located.

The second device may transmit a first transmitted signal which reflects off the object thereby forming the first signal, and the first device may transmit a second transmitted signal which reflects off the object thereby forming the second signal.

As discussed herein, the object to be located does not require a means to transmit a signal in order to be detected and its position determined, and so the reflected signal is not a signal created by the object but rather a reflection of a signal transmitted by one of the peer to peer wireless communication devices. With the first device acting as the transmitter of the second transmitted signal and as the receiver of the first signal, and the second device acting as the transmitter of the first transmitted signal and receiver of the second signal, the method can determine the position of the object using two differing angles of arrival whilst only requiring two devices.

Thus the second device may be configured to transmit a first transmitted signal and the first device may be configured to transmit a second transmitted signal.

The method may comprise emitting a first ping signal from the first device to elicit the first transmitted signal from the second device in response. Thus, the method may comprise receiving the first ping signal using the second device and emitting the first transmitted signal in response thereto. In this way, the first device can check for objects to be detected. If the first device receives the first reflected signal after sending the first ping signal, then there may be an object present for detection, since without a means of reflection (e.g. the object) present in the field view of the devices the second device would not receive the first ping signal, and the first device would not receive the first transmitted signal in response.

For the case in which the field of view of the devices ordinarily comprises no means for reflection, i.e. the field of view of the devices is open space with nothing present during background operation that could reflect the signals, a first ping signal that is detected by the second device or similarly a first signal that is detected by the first device must have been reflected by a newly arrived object in the field of view which can be considered as the target object to be detected.

For the case in which the field of view of the devices ordinarily comprises means for reflecting the signals without the object to be detected being present, i.e. the field of view of both of the devices comprises a background scene such as a room, garden, street or the like which may include components such as walls, furniture, trees, street lights, or the like (e.g. any static, stationary obstacles), the ping signal may be detected by the second device and the first signal may be detected by the first device without an object to be detected being present i.e. via background reflections from the typically stationary objects. This background scene can be learned and thereby accommodated through a calibration process carried out during installation and/or updated throughout use so that any of the signals detected via reflections arising from the components of the background scene can be discarded from the analysis to detect the presence of the object to be located. Detection of the first ping signal by the second device arising from a new reflection, that is from a reflection indicating an object is present at a position in the field of view that is not known to comprise the background scene, will be indicative of the presence of the object to be detected and the first transmitted signal can then usefully be transmitted for determining the position of the object. The same background effects can be similarly accounted for when analysing the first signal arising from the reflection of the first transmitted signal.

Thus when the field of view is devoid of a means for reflecting the first ping signal and/or the first transmitted signal, e.g. a wide open space, a signal received by the respective device is indicative of the presence of the object, and when the field of view comprises a background scene which ordinarily comprises stationary (non-changing) reflective means a calibration process may be used to discount undesirable reflections from background components that are not indicative of the presence of the object to be located.

Thus, the first and/or second device may be configured to perform a calibration procedure e.g. during installation or upon demand. The calibration procedure may detect obstacles within the field of view of the first and/or second device over a predetermined period of time, thereby enabling the first and/or second device to account for stationary obstacles within its field of view. Thus, the first and/or second device may be operable to calibrate itself/themselves to a particular background scene, and may thereby be operable to detect changes in that background scene so that the intruding object may be detected. The calibration process may be performed by a central controller or the like, which central controller may be provided to control the first and/or second device, and hence the accommodation of the background scene may be achieved by the central controller.

The method may comprise emitting a second ping signal from the second device to elicit the second transmitted signal from the first device in response. Thus, the method may comprise receiving the second ping signal using the first device and emitting the second transmitted signal in response thereto. In this way, the second device can check for objects to be detected. If the second device receives the second reflected signal after sending the second ping signal, then there may be an object present for detection, since without a means for reflection (e.g. the object) present in the field of view of devices the first device would not receive the second ping signal, and the second device would not receive the second transmitted signal in response.

As discussed above in relation to the emission and detection of the first ping signal, in the case where the field of view of the devices comprises an open space where there is ordinarily no means for reflection, detection of the second ping signal by the first device is indicative of the presence of the object to be positioned having due to the reflection produced.

In the case where the field of view of the devices ordinarily comprises a background scene comprising means for reflecting the signals without the object to be located being present, detection of the second ping signal by the first device may arise due to reflection(s) of the second ping signal from components in the background scene in the field of view of the devices. The method may then comprise a calibration process in order to discount second ping signals detected by the first device that are the result of reflections from components of the background scene.

Thus, only in the event that the object is present for detection will the first and/or second device ping each other so as to lead to detection of the object.

Although the calibration process is described above with reference to the exchange of first and/or second ping signals, the central controller (and/or the first and/or second device as the case may be) may be configured to perform the calibration process without use of the first and/or second ping signals. For example, the calibration process may additionally use the first and/or second reflected signal, or may use only the first and/or second reflected signal.

A third device may transmit a first transmitted signal which reflects off the object thereby forming the first signal and the second signal, wherein the third device is a peer to peer wireless device, and may be isolated from the first and second devices such that there is no line of sight communication in the radio frequency domain between the devices.

The third device may be used to transmit the first transmitted signal. This device need only transmit a signal and need not detect a reflected signal. Thus, the third device may act as a sort of 'illumination' device, emitting signals that will be detected by the first and/or second devices in the event that an object is present.

The object may not transmit a radio frequency signal, or may not transmit a radio frequency signal which is detected by the respective devices.

As a result of using the detection of reflected signals, and not direct signals, to determine the position of the object, the position of the object can be determined using this method once the object appears in the field of view of the first and second devices (and the third device if present) and if the object is able to reflect the transmitted signal. The object need not produce a signal; this increases the number and types of object which may be detected and enables the position detection system to be employed in many more scenarios compared to a line of sight peer to peer ranging system that is only capable of detecting peer to peer wireless communication devices. Although the reflected signal is described as originating from the object this is intended to mean that the reflection occurs at the object and that the initiation of the transmitted signal becoming the reflected signal occurs at the object due to the reflection only. Thus the object may not be configured to transmit a radio frequency signal to be detected by either of the first or second device in order for its position to be determined.

Calculation of the position of the object may be also based on a time of arrival of the first and/or second signal at the respective device. Calculation of the position of the object may also be based on a received signal strength indicator corresponding to the first and/or second signal received at the respective device.

The time at which the reflected signal is received by the respective device defines a time of arrival of the reflected signal. If the time at which the transmitted signal associated with the reflected signal originated from the respective transmitter device is known, a combined path length over which the transmitted and reflected signal have travelled can be determined e.g. using a calculation based on the speed of light. This known travel distance defines a locus of points from which the reflection must have occurred. The locus of points can be determined using knowledge of the positions of the first and second devices. The positions of the transmitting device and the receiving device define the foci of an ellipse such that the distance travelled from one device to a point on the ellipse and then to the other device is identical to the distance travelled from one device, to any other point on the ellipse and then to the other device. The distance tracked by this route, i.e. from the focus to a point on the ellipse to the other focus, is equal to the path length of the transmitted and subsequently reflected signal. The loci defined by the ellipse therefore define possible positions of the reflective object. A further measurement, such as the angle of arrival of either the first or second reflected signals, can then be used to determine the location around the ellipse of the reflective object. When the time of arrival is known in combination with both of the first and second angles of arrival, the loci defined by the time of arrival can be used to improve the accuracy of the position determination.

The received signal strength indicator can be used in a similar way to define the locus, or ellipse of loci, from which the reflection may have occurred. Because the signal strength attenuates over distance, the strength of the received signal can be used to determine the distance over which the signal travelled having been transmitted from the respective device and reflected by the object before being received by the respective device. In particular, when the peer to peer communication devices use a Bluetooth Low Energy 5.1 protocol the received signal strength intensity indicator may be used.

The first and/or second peer to peer wireless communication device may comprise a native protocol that uses a time of arrival calculation and/or a native protocol that uses a received signal strength indicator. The step of calculating the position may be based on a native time of arrival protocol embodied on the first and/or second device. The step of calculating the position may be based on a native received signal strength indicator protocol embodied on the first and/or second device.

Calculation of the position of the object may not be based on the time of arrival of the first and/or second signal at the respective device. Calculation of the position of the object may not be based on a received signal strength indicator corresponding to the first or second signal detected at the respective device. Calculation of the position of the object may use only a native angle of arrival protocol of the first and/or second device.

Using the first and second angles of arrival allows the position of the reflective object to be determined without the positions of the devices to be known, all that need be known in addition to the first and second angles of arrival is the distance between the two devices. To use the time of arrival or the received signal strength indicator or both to define the loci of potential positions of the reflective object as discussed above, the positions of the two devices must be known. Here the calculation of the position of the reflective object does not require that the time of arrival, received signal strength or positions of the devices is known. Thus, the method may comprise calculating the position of the object when only the respective angle of arrival is output from the first and second devices. The method may comprise outputting from the first device only the angle of arrival of the first signal at the first device, and may comprise outputting from the second device only the angle of arrival of the second signal at the second device.

The radio frequency isolation between the first and second devices may be achieved using a physical (e.g. tangible) barrier that absorbs radio frequency signals. It is possible to block direct signals from the transmitting device from being received at the receiving device by placing an obstacle or barrier in between the two devices. By placing the barrier in the line of sight formed between the two devices the barrier can shield the receiving device from direct transmitted signals. The barrier may comprise an object sufficiently opaque to radio waves such that the signals are absorbed. That is, when the signals penetrate the barrier the attenuation is so great that negligible signal strength is transmitted. A barrier with sufficient opacity to radio waves can be achieved by tailoring the combination of the radio opacity of the material used for the barrier and the thickness of the barrier. Thus, the line of sight isolation of the first and second devices may be achieved by providing an electromagnetic absorber between the first device and the second device. The electromagnetic absorber may be configured to substantially prevent transmission therethrough of radio signals in the operational range of the first and/or second device. The barrier may alternatively or additionally comprise an obstacle which reflects and/or scatters radio waves such that the signals do not penetrate the barrier or obstacle but instead bounce off the surface of the barrier or obstacle. As such the radio wave signal may not reach the receiving device directly. Thus, the line of sight isolation of the first and second devices may be achieved by providing an electromagnetic reflector between the first device and the second device. The electromagnetic reflector may comprise a metal which is reflective to radio waves. The electromagnetic reflector may be configured to substantially prevent transmission therethrough of radio signals in the operational range of the first and/or second device.

Hence, radio frequency isolation between the devices is achieved using a physical barrier that absorbs and/or reflects the first and second transmitted signals so that the first and second transmitted signals are not directly received bh the respective receiving device.

The radio frequency isolation between the first and/or second device may be achieved via a null in the receiving antenna.

It is possible to design antennas having a null in their detection capabilities corresponding to a certain direction or location from which signals cannot be received. By incorporating such a null into the antennas of the receiving devices the line of sight between the devices can be blocked. A null in the receiving antenna can be in the direction of the transmitting device. Thus, the antenna(s) of the first device may be configured so that they cannot detect a signal directly from the second device, and/or so that they cannot transmit a signal directly to the second device. The antenna(s) of the second device may be configured so that they cannot detect a signal directly from the first device, and/or so that they cannot transmit a signal directly to the first device.

By using either process to isolate the first and second devices from one another, communication via direct signals between the two devices can be prevented and so only those signals that have reflected off an object can be detected. This means that any detected signal can be identified as a reflected signal without interference from direct signals which manifestly contain no information regarding the position of a reflected object.

The field of view of the respective devices may substantially overlap.

The object should be in the field of view of the transmitting device in order for a reflected signal to be produced, and the object must also be in the field of view of the receiving device in order for the reflected signal to be received. The field of view of a device may refer to the area over which a signal may be transmitted and a reflection subsequently received, the field of view is limited by distance due to the attenuation of the signal and is limited by angular range over which the signals can be transmitted or detected. An object may therefore only be detected if it is within the field of view of both the transmitting device and the receiving device. It is desirable for the method to be able to determine the position of the object over a broad area. Therefore it is beneficial to ensure that there is a substantial overlap of the field of view of the devices to increase the regions in which the object can be detected. Thus, the devices may be disposed in locations such that their fields of view overlap to a substantial extent, thereby covering an area in which the object may be detected (i.e. in which the object is detectable).

The respective peer to peer wireless devices may be ultra-wideband devices and may use high repetition pulse impulse radio (HRP-UWB), the respective transmitted signals comprising a HRP-UWB radio pulse.

The transmitted signal may therefore comprise at least one HRP-UWB pulse, the entire information to be conveyed by the signal may require multiple pulses in accordance with the ultra-wideband communication protocol. The devices may be off the shelf devices which are readily available and capable of using ultra-wideband (UWB) communication protocols. For example the devices may compatible with standards IEEE802.15.4 and IEEE802.15.4z for UWB and/or the standards and specifications (e.g. for UWB) defined by the Fine Ranging (FiRa) Consortium. Such standards and specifications enable the use of UWB protocols which can output angle of arrival information regarding received signals.

The devices may use any suitable frequency range for communication. For example, the devices may use frequencies between 2 gigahertz and 10 gigahertz. The devices may use frequencies between 3 gigahertz to 10 gigahertz. The devices may use frequencies between 6 gigahertz to 10 gigahertz. The devises may be frequencies between 6 gigahertz to 8.5 gigahertz. The HRP-UWB radio pulses may have a wide bandwidth of around 500 megahertz or higher, and short duration of around 2 nanoseconds, or the devices may use frequencies of between 2.4 and 2.5 gigahertz, and may use frequencies of around 2.45 gigahertz.

The UWB communication protocol standard uses signal transmission parameters such as frequencies between 2 gigahertz and 10 gigahertz, the frequency may be between 3 and 10 gigahertz, between 6 and 10 gigahertz, and may be between 6 and 8.5 gigahertz the HRP-UWB radio pulses have a wide bandwidth of around 500 megahertz or higher and short duration of around 2 nanoseconds.

Thus, the devices may be configured to be compatible with ultra-wideband (UWB) communication protocols, and therefore configured to operate using the corresponding UWB standards.

The devices may be Bluetooth Low Energy (BLE) communication devices (e.g. BLE 5.1 and/or BLE 5.2 device), and may be configured for operation according to those standards. The first and second devices may use signal transmission parameters such as frequencies of between 2.4 and 2.5 gigahertz and may be around 2.45 gigahertz i.e. within the commonly employed 2.4 gigahertz band.

The signals described herein may convey information e.g. time data, location data, device identifying information etc. That is, the signals may encode a volume of information therein (and may therefore be more than e.g. simple binary signals). The signals may be signals in accordance with standards IEEE802.15.4 and IEEE802.15.4z for UWB as defined by the Fine Ranging (FiRa) Consortium. The signals may be in accordance with BLE 5.1 and/or BLE 5.2 communication standards.

Thus, the devices may be configured to be compatible with Bluetooth Low Energy (BLE) 5.1 and/or 5.2 communication protocols, and therefore configured to operate using the corresponding BLE standards.

Each of the first and second devices may comprise two antennas spatially displaced such that the respective angle of arrival is calculable based on the time difference of arrival of the respective reflected signal at each antenna.

Thus the antenna arrangement comprising two antennas may allow the position of the object within a plane to be defined. The time difference of arrival may be defined as the difference in time between a signal being received at one antenna and the signal being received at the other antenna. The angle of arrival can be calculated as discussed above. The first and/or second device may comprise a plurality of antennas e.g. any suitable number to determine the angle of arrival of a signal.

The method may further comprise assuming that the object is in a known plane. For example the method may comprise assuming the object is on a floor. The method may comprise assuming the object is in a vertical plane e.g. a doorway, window, security boundary etc.

Thus, following this assumption a three-dimensional position of the object can be determined more simply e.g. whilst requiring that the angles of arrival comprise only an azimuthal component or only an elevational. For example, an angle of arrival comprising only an azimuthal component and no elevation component may define a plane from which the reflection must have originated, when the first and second angles of arrival are combined the two planes intersect forming a line at the intersection which further delimits where the reflection originated. An assumption of the plane in which the object causing the reflection resides further delimits the position of the object along the line formed by the two intersecting planes which generates a point location of the object.

The method may comprise assuming that the object is present on e.g. the plane defined by the floor, for example if the object is a human or an animal present in or walking through the field of view of the first and second devices. The devices may be positioned so that their field of view extends over the plane of a doorway and it may be assumed that the object is present in the plane of the doorway, in which case the object need not be on the ground for 3D positional determination and the system may therefore detect flying objects such as drones. The system may be set up so that any plane in which the reflective object is expected to be present may be used as the known plane. The system need not be confined to use indoors and may be set up out doors, in this case the known plane may be parallel to the side of a building, for example, such that the position of anything approaching the building and passing through that plane can be identified.

The first and second angles of arrival may each indicate the direction of the object relative to the first and second device respectively. For example, the first angle of arrival may comprise an azimuth and an elevation indicating the direction of the object from the first device i.e. the first angle of arrival may point to the object from the first device. Thus, the angle of arrival returned from each of the first device and the second device may point the direction to the object from the respective device. Any suitable coordinate system may be used to describe the angles of arrival.

At least one of the first and second devices may comprise three antennas spatially displaced, wherein the three antennas are not arranged in a co-linear configuration.

The angular information gathered using three antennas results in an angle of arrival comprising an azimuthal and elevational component calculated based on e.g. the time difference of arrival of the respective reflected signal at each of the three antennas. An angle of arrival comprising an elevational direction as well as an azimuthal direction defines a line along which the reflection must have originated. When this line is combined with either the plane extending from a receiving device along the angle of arrival comprising only an azimuthal direction (or only an elevational component), or the line formed by the other angle of arrival when it comprises an elevational and azimuthal direction, a point location of the reflective object can be defined within a three dimensional space.

Thus, at least one of the first and second devices may be configured to comprise three spatially displaced antennas which enable angle of arrival information to be output which comprises angular information in three dimensions.

The field of view of the devices in which the object may be detected may extend up to 100 metres. The field of view may extend up to 50 metres, or may extend up to 20 metres, or may extend up to 10 metres.

Thus the devices may receive reflected signals from objects which are up to 100 metres away. Typically a peer to peer device has a range of up to 200 metres such that if it was to communicate using direct signals transmitted and received along a line of sight the approximate maximum distance the devices can be from each other is around 200 metres. Because the present invention requires that the peer to peer devices do not transmit and receive direct signals but instead receive a reflected signal the approximate maximum distance between the reflecting object and the device is around 100 metres, hence the sum of the distance travelled by the transmitted signal and the reflected signal in this maximum case is around 200 metres.

The method may further comprise implementing the calculated position of the object in a security system so that a security breach may be detected and/or implementing the calculated position for controlling the operation of equipment.

The method of determining the position of an object may be implemented in a security system whereby the detection of an object within the field of view of the devices or within a pre-defined area of the field of view causes an alarm to be raised and/or consequential security procedure to be initiated. The devices may be installed in a building or may be integrated into the walls of a building so that the field of view of the devices may cover the exterior surroundings of the building and/or the interior surroundings of the building. The predefined area may be a specific location or region within the field of view where it is not permitted for the object to be. For example, it may not be permitted for a person or object to be within a certain distance of a building, or within a certain distance of a safe or artefact present in a room, or for a person or object to pass through a certain doorway. The initiated security procedure may be to sound an audible alarm, activate a light, notify the police or other security forces to the breach, or initiate additional measures to stop the security breach and/or protect the surroundings.

The method of determining the position of an object may be implemented in a system comprising additional components or elements that require activation, whereby the detection of an object within the field of view of the devices or within a pre-defined area of the field of view causes a component or device to activate. The predefined area may be a specific location or region within the field of view indicative of there being a requirement for the component to activate. For example, a person approaching/being in the vicinity of a door to or within a building may indicate that the door is required to open to let the person pass through, similarly a car approaching/being in the vicinity of a garage may indicate that the garage door is required to open to let the car in. The detection of an object within the field of view of the devices or within a pre-defined area of the field of view of the devices may activate components such as indoor and/or outdoor lighting, household appliances, apparatuses involved in traffic control, etc. In this way the method could be used as a 'hands free' way to control appliances.

The method of determining the position of an object may also be implemented for data collection and analysis purposes, for example monitoring of occupation levels of an area or room, the times of objects appearing in the field of view, etc. The data may be used further, for instance to determine an expected position of an object. The collection of data may be implemented for marketing or development purposes.

Viewed from a second aspect, the invention extends to a system configured to perform the method comprising any of the above features described with reference to the first aspect of the invention.

The system may be a security system, wherein the calculated position of the object is implemented for use in intruder detection. The system may be a device/equipment activation system wherein, the calculated position of the object is implemented for activating or operating devices/equipment. The system may be a monitoring system, wherein the calculated position of the object is implemented for use in data collection and analysis which may be further used in development, research or marketing purposes.

Viewed from another aspect, the invention provides a method of detecting an object by exchanging a signal between a first wireless communication device and a second wireless communication by reflecting the signal off the object. The first and second wireless communication devices may be peer to peer wireless communication devices. The method may comprise any and/or all of the features described herewith with reference to any aspect of the invention.

BRIEF DESCRIPTION OF THE DRAWINGS

Certain embodiments of the invention will now be described by way of example only and with reference to the accompanying drawings in which.

DETAILED DESCRIPTION OF THE INVENTION

Figure 1B:
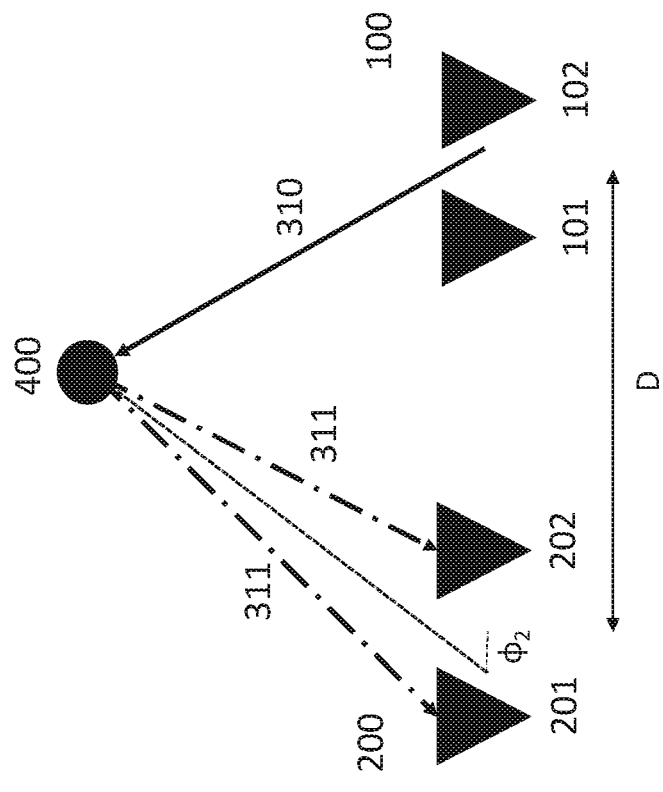
FIG. 1b is a schematic illustrating the determination of a second angle of arrival of a second reflected signal.
Figure 1A:
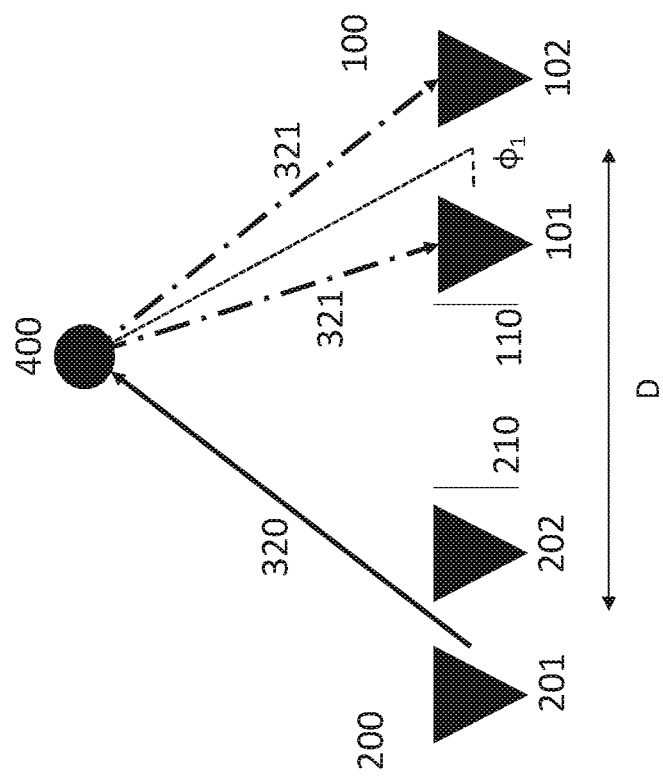
FIG. 1a is a schematic illustrating the determination of a first angle of arrival of a first reflected signal.

As seen in FIG. 1a, a first peer to peer wireless communication device 100 receives a signal 321 which has reflected from an object 400. The reflected signal 321 is the result of a first transmitted signal 320 reflecting off the object, the first transmitted signal 320 having been transmitted from a second peer to peer wireless communication device 200. That is to say, the transmitted signal 320 hits the object 400 and reflects, causing the reflected signal 321. The first device 100 comprises a first antenna 101 and a second antenna 102 and detects the reflected signal 321 at each of the antennas 101, 102. The first transmitted signal 320 may be broadcast by the second device 200 in response to receiving e.g. a first ping signal from the first device 100.

The first and second devices 100, 200 are peer to peer wireless communication devices. These may be off the shelf devices which are readily available and may be capable of using communication protocols such as, but not limited to, ultra-wideband (UWB) and/or Bluetooth Low Energy e.g. 5.1 or 5.2. For example the devices may compatible (and configured for use) with standards IEEE802.15.4 and IEEE802.15.4z for UWB and/or with the standards and specifications (e.g. for UWB) defined by the Fine Ranging (FiRa) Consortium. The angle of arrival $\Phi\neg$ is determined by a communication protocol native to the first device 100. In principle the native communication protocol will use the time difference of arrival (TDoA) of the first signal 321 detected by the first antenna 101 and the first signal 321 detected by the second antenna 102 to calculate the difference in the distance which the first signal 321 has travelled to reach each antenna 101, 102. Using knowledge of the distance between the two antennas 101, 102 the angle of arrival can be calculated.

First and second devices 100, 200 having UWB compatibility use high repetition pulse impulse radio (HRP-UWB) to transmit the second and first transmitted signals respectively. The transmitted signals therefore comprise a HRP-UWB radio pulse. UWB devices use frequencies between 2 gigahertz and 10 gigahertz, or be between 3 and 10 gigahertz, between 6 and 10 gigahertz, and may be between 6 and 8.5 gigahertz and the HRP-UWB radio pulses have a wide bandwidth of around 500 megahertz or higher, and short duration of around 2 nanoseconds.

First and second devices 100, 200 having Bluetooth low energy 5.1 compatibility transmit signals using a continuous carrier signal modulated using frequency shift keying. Bluetooth low energy 5.1 devices use frequencies between 2.4 gigahertz and 2.5 gigahertz, and may be around 2.45 gigahertz.

As seen in FIG. 1b, the first device 100 transmits a second transmitted signal 310 which is subsequently reflected by the object 400 forming a second reflected signal 311 received by the second device 200. The second device 200 comprises a first antenna 201 and a second antenna 202 and detects the reflected signal at each of the antennas 201, 202. The angle of arrival Φ2 is determined by a communication protocol native to the second device 200. The position of the object 400 can then be calculated based on the first and second angles of arrival Φ1, Φ2. The second transmitted signal 310 may be broadcast by the first device 100 in response to receiving e.g. a second ping signal from the second device 200.

The object 400 does not transmit a signal but only reflects the signal transmitted by the devices 100, 200. The object 400 need not be associated with an additional device to interact with/be detected by the system and method of the invention but need only be reflective to radio frequency signals.

The second device 200 is remote from the first device 100 so that the first and second angles of arrival Φ1, Φ2 differ sufficiently to enable an intersection of the lines extending along those angles of arrival to be distinguished. The devices are separated by a predetermined distance. The first and second devices may be separated by a distance of between 0.5 metres and 10 metres. The separation of the devices may preferably be between 2.5 metres and 10 metres, and may more preferably be between 5 metres and 10 metres. The separation distance is controlled by the requirement for the fields of view of the devices to overlap so that reflected signal can be detected as discussed in the summary section above, and the desired or acceptable error in position determination. The first and second devices are isolated from each other in the radio frequency domain such that no direct communication can occur between them. That is, only the first and second signals 321, 311 can be detected by the respective devices and the transmitted signals 320, 310 cannot be detected. This is to ensure that the received signal can be attributed to having originated from the position of the object 400 and is hence a reflected signal. Put another way, there is no line of sight between the first and second devices 100, 200 for radio frequency waves. As illustrated in FIG. 1a the radio frequency isolation may be achieved using physical barriers 110, 210 associated with the respective device and disposed so as to block radio frequency signals that arrive at the device from the direction of the respective transmitting device. The radio frequency isolation can alternatively be achieved by incorporating nulls in detection fields of the antenna 101, 102, 201, 202 of the devices, the nulls being configured such that the antenna cannot detect signals which arrive at the antenna from the direction of the respective transmitting device.

Figure 2:
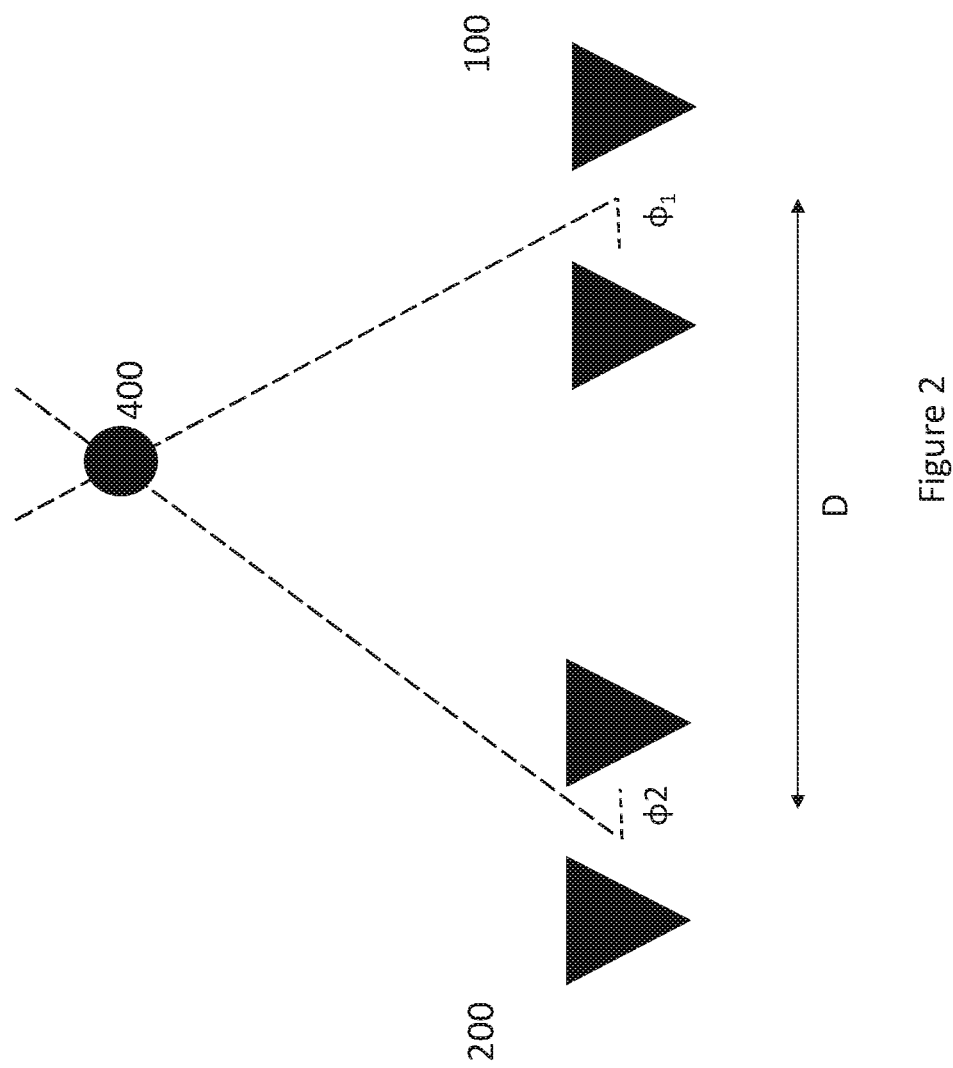
FIG. 2 is a schematic illustrating the determination of the position of an object using the first and second angles of arrival.

As seen in FIG. 2 the position of the object 400 can be determined from the intersection of the trajectory extending from the devices 100, 200 along the respective angle of arrival Φ1, Φ2. Once the distance D between the devices 100, 200 is known the angles of arrival Φ1, Φ2 can be implemented to define a region in which the reflections must have originated relative to the devices, and therefore a region in which the object must be located. If the position of the devices 100, 200 (and/or the position of one device and the direction and distance D between the devices 100, 200 is known) the region in which the object must be found can be defined without reference to a device's position. That is, the location of the object may be determined with reference to at least one of the devices, and hence if the absolute position of at least one device is known then the absolute position of the object can also be determined (and therefore the position of the object can be defined without reference to e.g. distance from the device).

When the angle of arrival Φ1, Φ2¬ comprises angular information in one plane only, i.e. an azimuthal angle or an elevational angle only, that is the angle of arrival Φ1, Φ2 comprises angular information within one plane only and comprises no component within a direction orthogonal to that plane, the trajectory extending from a device 100, 200 along the respective angle of arrival Φ1, Φ2 defines an angle of arrival plane since a component in a third direction is not defined. The intersection of two such angle of arrival planes results in a line defining the locus of points along which the object may be found. That is the position of the object is situated along the line formed by the intersection of the two angle of arrival planes.

A two dimensional location of the object can therefore be determined. It may be assumed in some instances that the object will be located in a known plane. If this known plane is non-coplanar with either of the angle of arrival planes a point along the linear intersection of the angle of arrival planes can be defined where the known plane intersects the linear intersection of the angle of arrival planes. The parameters of the known plane may be assumed based on the application of the system. The location of the devices, their surroundings and any further intended purpose relating to the determination of the position of the object may generate or impose an expected position of the object. For example, the devices may be placed such that their field of view comprises a door way and as such determining the position of any objects passing through the doorway allows for monitoring objects entering/leaving a room, the plane of the doorway can hence be set as the known plane and the 2D position determined includes the height of an object in the doorway. Another example includes that the devices are placed such that their field of view includes an area where it is expected that the target objects will be, at least partly, on the ground, hence the plane of the ground can be defined as the known plane.

Figure 3:
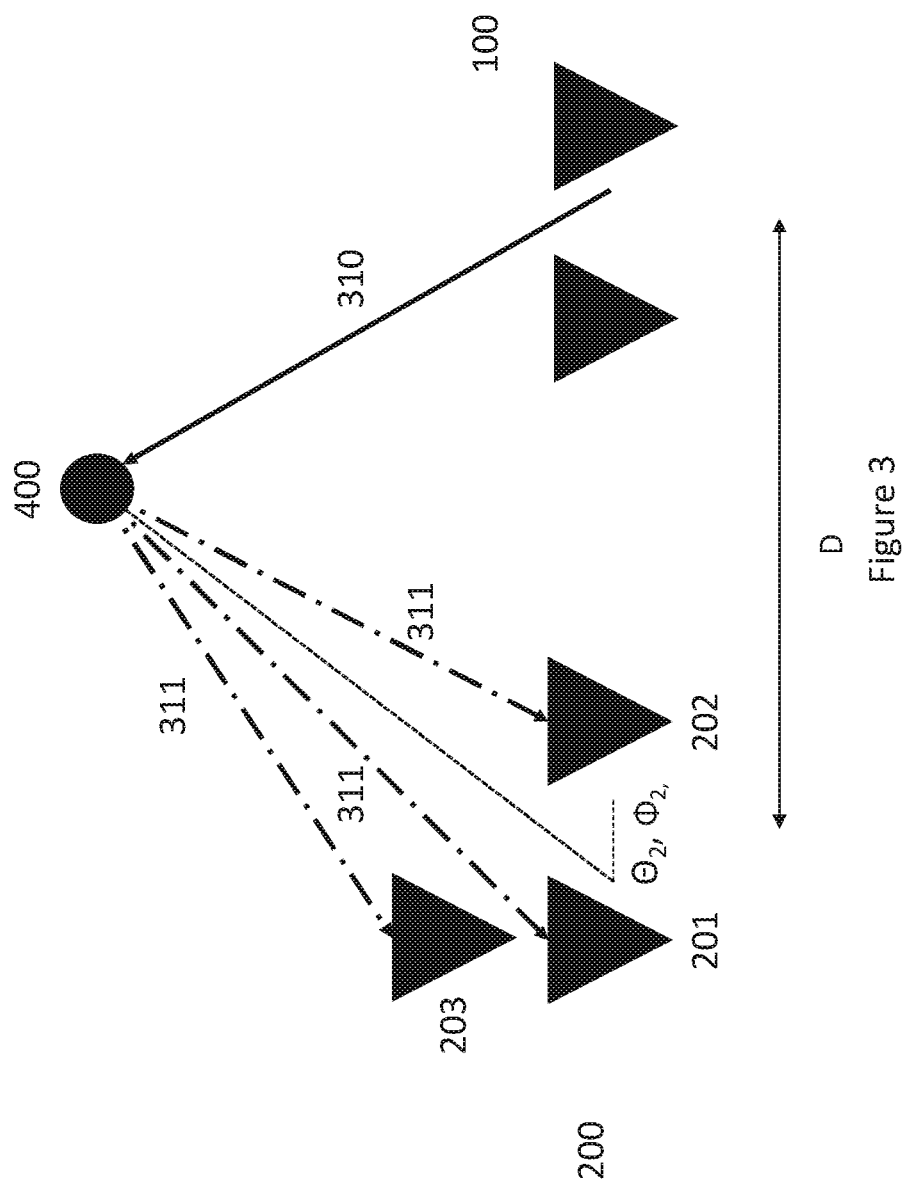
FIG. 3 is a schematic illustrating the use of three antennas for determining an azimuthal and elevational angle of arrival of a reflected signal.

As seen in FIG. 3, a device 200 may comprise three antennas 201, 202, 203. When these three antennas 201, 202, 203 do not lie in a co-linear arrangement the angle of arrival Θ2, Φ2 can be determined from the time difference of arrival as calculated above and applied to the three signal detection events at each antenna, and will comprises an elevational component Θ2 and an azimuthal component Φ2¬. This information can be applied to determine the three-dimensional location of the object. That is, the antennas may be arranged to determine the direction of a signal in three dimensions. Put one way, the elevational component Θ2 determines the position along the line of intersection of the angle of arrival planes determined by the azimuthal component of the first and second angles of arrival. This negates the need to assume that the object is located in a known plane. In some embodiments both the first and second devices 100, 200 comprised three antennas. The additional information aiding in the precision and accuracy of the determination of the position of the object.

Figure 4:
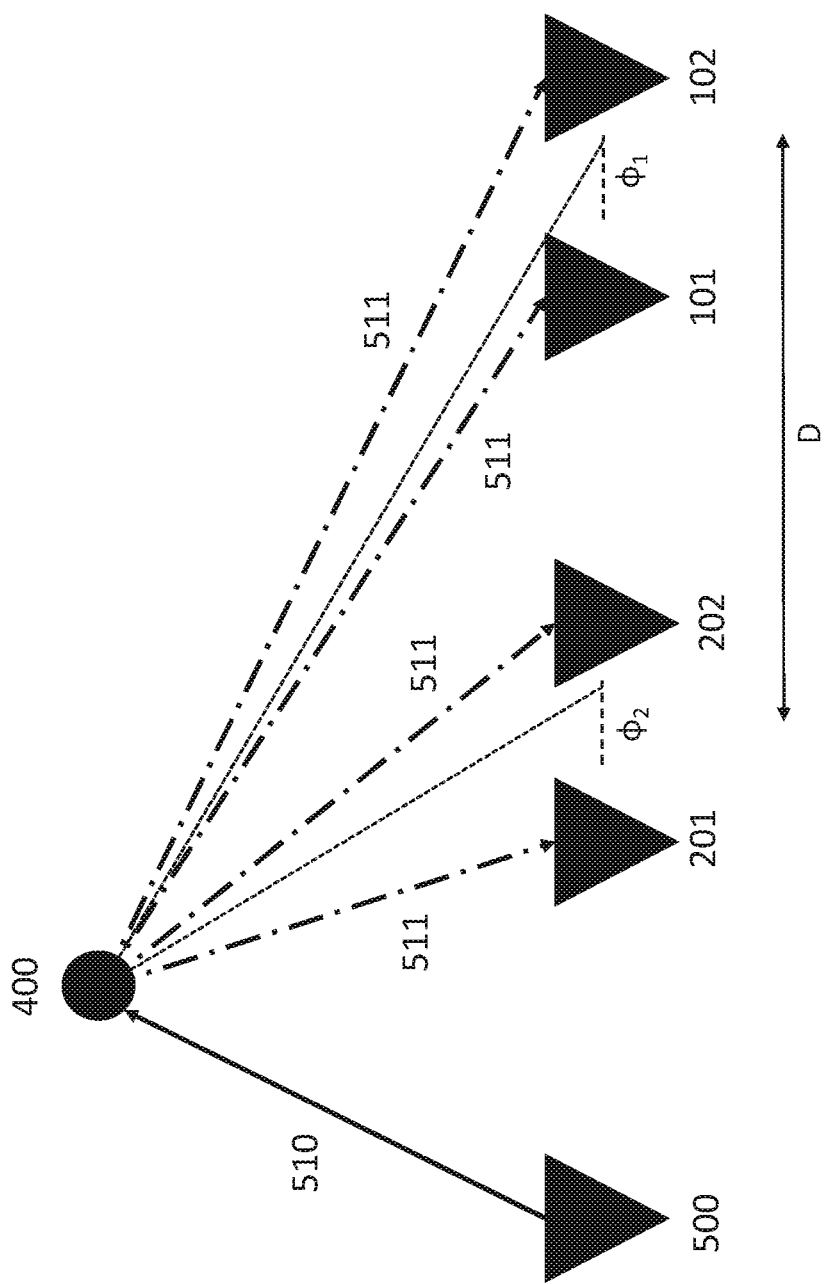
FIG. 4 is a schematic illustrating the determination of a first and second angle of arrival of a reflected signal measured by first and second devices, the reflected signal being a reflection of a transmitted signal from a third device (and the position of the object can be determined in a corresponding way to that shown in FIG. 2).

FIG. 4 illustrates another embodiment of the invention in which the first and second devices 100, 200 receive a signal 511 which has reflected from an object 400. The signal 511 thereby provides the first and second signals detected by the first and second devices respectively. The signal 511 is the result of a reflection if a transmitted signal 510 having been transmitted from a third device 500. That is, the transmitted signal 510 hits an object 400 and reflects causing a reflected signal 511. The reflected signal 511 is detected at the antennas 101, 102, 201, 202 of the first and second devices 100, 200. The determination of the respective angles of arrival and the position of the object is carried out similarly to the explanation above including the case where the first and second devices may comprise three antennas. In this embodiment the distance D between the first and second devices must be known to determine the position of the object, however the distance between the third device and either of the first and second device need not be known. The third device 500 is also isolated from the first and second devices 100, 200 to the extent that radio frequency signals transmitted by the third device cannot be directly detected by the first or second device 100, 200 but instead it is required that the transmitted signal 510 is reflected and the first and second devices detect the reflected signal 511 only. This radio frequency isolation can be achieved as explained above using either a physical barrier which absorbs and/or reflects the transmitted signal 510 and therefore blocks it from reaching the first and second devices, or by nulls formed in the antennas 101, 102, 201, 202 in the direction of the transmitted signals 510 from the third device 500.

The third device may be a UWB device or a Bluetooth LE 5.1 device as described above in relation to the first and second devices. All of the devices 100, 200, 500 in the system must use the same communication protocol.

Figure 5:
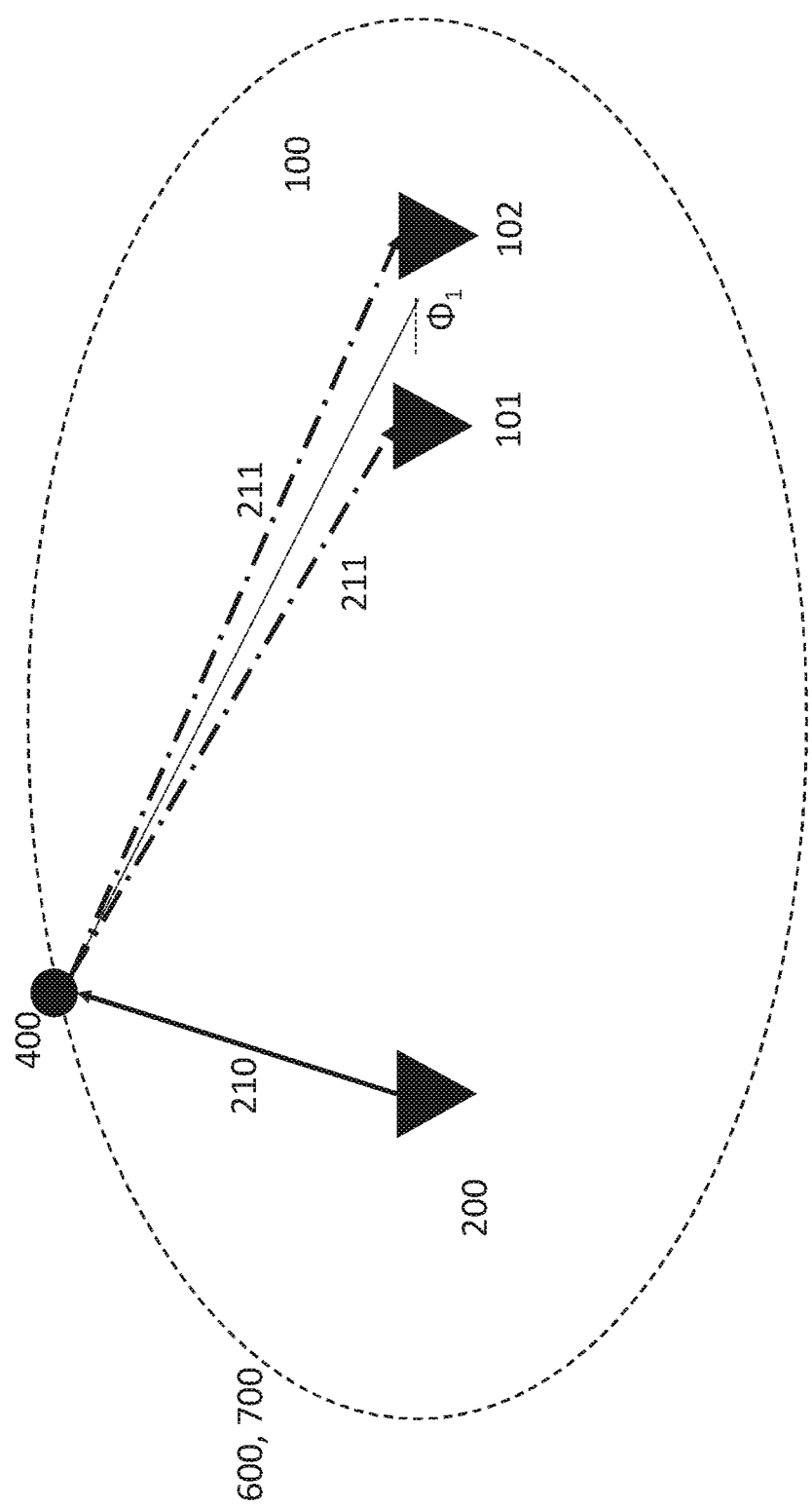
FIG. 5 is a schematic illustrating the determination of the position of an object using the time of arrival of a reflected signal and the angle of arrival of the reflected signal.

FIG. 5 illustrates an example in which the time of arrival of the signal 211 at the first device 100 may be used to determine the position of the object 400. The second device 200 transmits a first transmitted signal 210 which reflects off the object creating reflected signal 211 which is detected by the antennas 101, 102 of the first device 100. The transmitted signal will contain information such as a time stamp, indicating the time that the transmitted signal 210 left the second device 200, which can be used to infer the time taken for the transmitted signal to leave the second device 200 and for the reflected signal 211 to be detected by the first device 100. The time taken is indicative of the distance travelled by the transmitted signal 210 from the second device 200 to the object 400 and for the reflected signal 211 to travel from the object 400 to the first device 100. Once this distance is known a time of arrival ellipse 600 can be determined. The time of arrival ellipse 600 defines the loci which form a plane curve surrounding two focal points, such that for all points on the curve the sum of the two distances to the focal points is a constant, the focal points being the first and second devices. The angle of arrival $\Phi 1\neg$, calculated as previously described, can then be used to determine which point on the time of arrival ellipse 600 corresponds to the position of the object since the object must lie on both the ellipse and the at the correct angel relative to the first device. The intersection of the line extending from the first device 100 at the angle of arrival $\Phi 1$ and the time of arrival ellipse indicates the position of the object. Put another way, the time of arrival ellipse delimits where along the line extending from the first device 100 at the angle of arrival $\Phi 1$ the object lies.

In some embodiments, a received signal strength indicator can be used to determine the position of the object in the same way as the time of arrival. Due to the attenuation of the signal with distance the strength of the reflected signal 211 measured by the first device 100 will decrease the further the signal has had to travel. The strength of the reflected signal 211 received by the second device 100 will therefore depend on the distance between the second device 200 and the object 400, and the object 400 and the first device 100. A received signal strength ellipse 700 can hence be defined in a corresponding manner to the time of arrival ellipse 600.

Typically use of the time of arrival is preferred to the received signal strength indicator as the time of arrival is more precise. The ability for the system to use either of the time of arrival or received signal strength indicator will depend on the native communication protocol of the device. An embodiment of the invention may comprise the use of the time of arrival and/or signal strength indicator to increase the accuracy and precision of the determination of the position of the object using the first and second angles of arrival $\Phi 1$, $\Phi 2$. The position of the object 400 can be determined with or without the use of the time of arrival and/or the received signal strength indicator.

The first and second devices 100, 200 (and the third device 500 where that is provided) output the angle of arrival of the respective reflected signal to a central controller (not shown). They may each only output the angle of arrival, and that may be sufficient, together with the isolation of the devices from each other, to determine the location of the object 400.

What is claimed is:

1. A method of determining a position of an object, the method comprising:
   receiving a first signal reflected from the object using a first device, wherein the first device is a peer to peer wireless communication device,
   interrogating a native communication protocol on the first device to output a first angle of arrival corresponding to the angle of arrival of the first signal at the first device,
   using a second device remote from the first device to receive a second signal reflected from the object, wherein the second device is a peer to peer wireless communication device,
   interrogating a native communication protocol on the second device to output a second angle of arrival corresponding to the angle of arrival of the second signal at the second device,
   calculating the position of the object based on the first and second angles of arrival,
   wherein the first and second devices are isolated from each other such that there is no line of sight communication in the radio frequency domain between the devices.

2. The method of claim 1, wherein the second device transmits a first transmitted signal which reflects off the object thereby forming the first signal, and
   wherein the first device transmits a second transmitted signal which reflects off the object thereby forming the second signal.

3. The method of claim 1, wherein a third device transmits a first transmitted signal which reflects off the object thereby forming the first signal and the second signal, wherein the third device is a peer to peer wireless device and is isolated from the first and second devices such that there is no line of sight communication in the radio frequency domain between the devices.

4. The method of claim 1, wherein the object does not transmit a radio frequency signal received by either of the first and second devices.

5. The method of claim 1, wherein calculating the position of the object is also based on a time of arrival and/or a received signal strength indicator corresponding to the first and/or second signal received at the respective device.

6. The method of claim 1, wherein calculating the position of the object is not based on the time of arrival and/or a received signal strength indicator corresponding to the first or second signal detected at the respective device.

7. The method of claim 1, wherein radio frequency isolation between the devices is achieved using a physical barrier that absorbs and/or reflects radio frequency signals, and/or the radio frequency isolation is achieved via a null in the receiving antenna.

8. The method of claim 1, wherein the field of view of the first device and the field of view of the second device substantially overlap.

9. The method of claim 1, wherein the first and second peer to peer wireless devices are ultra-wideband devices and preferably use high repetition pulse impulse radio (HRP-UWB), the respective transmitted signals comprising a HRP-UWB radio pulse.

10. The method of claim 9, wherein the first and second devices use frequencies between 2 gigahertz and 10 gigahertz, and the HRP-UWB radio pulses have a bandwidth of around 500 megahertz, and duration of around 2 nanoseconds.

11. The method of claim 1, wherein the peer to peer wireless devices are Bluetooth Low Energy (BLE) 5.1 devices, and wherein the devices use frequencies of between 2.4 gigahertz and 2.5 gigahertz.

12. The method of claim 1, wherein each of the first and second devices comprise two antennas spatially displaced such that the respective angle of arrival calculable based on the time difference of arrival of the reflected signal at each antenna.

13. The method of claim 1, wherein the first device and/or second device comprises three antennas spatially displaced from each other, wherein the three antennas are not arranged in a co-linear configuration.

14. The method of claim 1, wherein the field of view of the devices in which the object is detectable extends up to 100 metres.

15. The method of claim 1, further comprising,
implementing the calculated position of the object in a security system in order to detect a security breach and/or implementing the calculated position in order to control the operation of equipment.

* * * * *